(12) United States Patent
Amielh-Caprioglio et al.

(10) Patent No.: US 7,373,601 B2
(45) Date of Patent: May 13, 2008

(54) OBJECT TRANSFER METHOD WITH FORMAT ADAPTATION

(75) Inventors: Myriam Amielh-Caprioglio, Paris (FR); Mathieu Champion, Paris (FR); Sylvain Devillers, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 652 days.

(21) Appl. No.: 10/239,277

(22) PCT Filed: Jan. 30, 2002

(86) PCT No.: PCT/IB02/00336

§ 371 (c)(1),
(2), (4) Date: Sep. 20, 2002

(87) PCT Pub. No.: WO02/063494

PCT Pub. Date: Aug. 15, 2002

(65) Prior Publication Data

US 2004/0015535 A1    Jan. 22, 2004

(30) Foreign Application Priority Data

Feb. 5, 2001   (FR) .................................. 01 01530
Oct. 30, 2001  (EP) .................................. 01402815

(51) Int. Cl.
    *G06F 15/00* (2006.01)
(52) U.S. Cl. ..................... 715/523; 715/513; 715/530
(58) Field of Classification Search ............... 715/522, 715/523, 513, 517–518, 520, 764, 529–531
    See application file for complete search history.

(56) References Cited

U.S. PATENT DOCUMENTS

| | | | |
|---|---|---|---|
| 6,128,655 A * | 10/2000 | Fields et al. ................. 709/219 |
| 6,226,642 B1 * | 5/2001 | Beranek et al. ............... 707/10 |
| 6,585,778 B1 * | 7/2003 | Hind et al. .................. 715/513 |
| 6,589,291 B1 * | 7/2003 | Boag et al. .................. 715/513 |
| 6,665,442 B2 * | 12/2003 | Sekiguchi et al. ........... 382/224 |
| 6,857,102 B1 * | 2/2005 | Bickmore et al. .......... 715/501.1 |
| 7,010,570 B1 * | 3/2006 | Boies et al. ................. 709/205 |
| 7,072,987 B2 * | 7/2006 | Jurisch et al. .............. 709/249 |
| 2001/0044809 A1 * | 11/2001 | Parasnis et al. ............. 707/513 |
| 2002/0010716 A1 * | 1/2002 | McCartney et al. ......... 707/517 |
| 2002/0059278 A1 * | 5/2002 | Bailey et al. ................ 707/100 |
| 2002/0087601 A1 * | 7/2002 | Anderson et al. ........... 707/515 |
| 2002/0091665 A1 * | 7/2002 | Beek et al. .................... 707/1 |
| 2003/0018818 A1 * | 1/2003 | Boliek et al. ................ 709/247 |
| 2004/0261017 A1 * | 12/2004 | Perry .......................... 715/513 |

FOREIGN PATENT DOCUMENTS

| | | |
|---|---|---|
| JP | 11066051 | 9/1999 |
| JP | 2000020507 | 1/2000 |
| JP | 2000222275 | 11/2000 |
| JP | 2000222276 | 11/2000 |
| WO | WO9941734 | 8/1999 |

* cited by examiner

*Primary Examiner*—Thu Huynh (57) ABSTRACT

A method of transferring a file includes generating a version of an object version at the source entity as a function of the profile of the destination entity (e.g., screen, calculation capacity, storage). A basic document is basic version of the object described in a document written in a markup language (e.g., XML). One or more transformations are defined (for example into the XSL format). The application of a transformation to the basic document allows generation of a transformed document. An adapted version of the object is generated from the transformed document.

14 Claims, 3 Drawing Sheets

OBJECT TRANSFER METHOD WITH FORMAT ADAPTATION

The present invention relates to a method of transferring a file containing an adapted version of an object, from a source entity to a destination entity. The invention also relates to a method of generating a file containing an adapted version of an object.

The invention also relates to:
equipment suitable for implementing such a file generation method,
a transmission system suitable for implementing such a file transfer method.

The invention also relates to programs comprising instructions for the execution of steps of such methods.

The invention finally relates to:
a document written in a markup language,
a file formatted in boxes comprising at least a main box which contains a progressive file and at least a side box which contains a document written in a markup language, describing said progressive file,
and a storage medium on which such a document or such a file is stored.

The invention finds interesting applications notably in the field of the Internet. Ever more pieces of equipment have access to the Internet. This is the case, for example, with personal computers, mobile telephones, personal digital assistants, portable computers, pocket computers . . . . These pieces of equipment have more or less limited resources (screen, calculation capacity, storage capacity . . . ) and are connected to the Internet by links offering varying rates (radio links, wire links, optical links . . . ). It is necessary for the objects to be transferred to be adapted as a function of the profile of the receiver. This notably permits to avoid the useless transmission of data which the receiver will not be able to use, and thus to save on the passband.

International patent application WO 99/41734, published Aug. 19, 1999, describes a graphic file organized in progressive sections and a method of selectively transferring such a file. This method comprises for the receiver to indicate the sections he needs in the progressive file.

This method thus implies that the receiver knows the structure of the graphic file and that he knows how to determine the sections to be recovered as a function of the resolution or the quality he wishes to obtain.

It is notably an object of the invention to propose a method of transferring a file containing an adapted version of an object, which method does not need specific intelligence from the user.

This object is achieved with a transfer method as described in the opening paragraph and characterized in that, while said source entity comprises a memory for storing a basic document written in a markup language and describing a basic progressive file which contains a basic version of said object, said method comprises:
a step of selecting a predefined transformation as a function of said adapted version,
a transformation step which comprises applying the selected transformation to said basic document, for generating a transformed document,
a step of generating a file containing said adapted version of said object based on said transformed document,
a step of transferring the generated file.

Thus the adaptation of the version takes place on the side of the source entity. Therefore no particular intelligence is necessary on the side of destination entities.

According to the invention, the source entity uses a basic document in a markup language, which document describes the basic progressive file which contains a basic version of the object to be transferred. The source entity also has one or more predefined transformations intended to be applied to this basic document to obtain one or more transformed documents. The file to be transferred is generated from the obtained transformed document. It contains an adapted version of the object to be transferred. This adapted version is different from the basic version.

The invention notably comprises describing the objects in a markup language and applying the transformations to the obtained descriptions. In the following, these descriptions are called documents. Such a markup language permits to describe the structure of the basic progressive file. This means that the structure of the basic progressive file is visible in the obtained documents. It is thus possible to define transformations which apply to these documents. These transformations are expressed in a simple manner and their use requires little calculation.

By performing the transformations with the document in which the structure of the basic progressive file is visible, it is avoided having to decode the basic progressive files so as to recode them into another format. The calculation load is thus limited to a considerable extent.

Moreover, according to the invention, it is sufficient to store the basic document at the source entity and, in certain embodiments, the basic progressive file from which it comes, as well as the predefined transformations. The files to be transferred are generated when the need arises from the basic document by applying an adapted transformation. Thus it is not necessary to store them in the memory of the source entity. Thus the quantity of information to be stored at the level of the source entity is limited considerably.

In a preferred embodiment of the invention, the basic document contains one or more elements delimited by tags and which may contain one or more attributes, and said transformation comprises suppressing one or more elements and modifying the value of one or more attributes and/or one or more elements.

The predefined transformation is advantageously written in a transformation language which permits to define rules for transforming a document written in said markup language into another document written in said markup language.

By way of example, the markup language is an XML language (eXtensible Markup Language) and said transformation language is an XSL language (eXtensible Style sheet language) the two being defined by the W3C consortium.

It is another object of the invention to propose a document written in a markup language, using a set of given characters, and describing a binary file which contains binary data, markers and parameters associated to one or more markers. According to the invention, such a document:
comprises elements which contain contents, and/or one or more attributes, and/or one or more sub-elements,
an element being associated to each marker, the possible parameters associated to said marker constituting a sub-element or an attribute of said element, and the contents of one or more elements being in the form of characters of said set said characters being linked with said binary data.

In a first embodiment at least part of the contents of said document corresponds to binary data of said binary file converted into characters of said set.

In this first embodiment the document is independent of the binary file because it contains itself the data of the binary file. However, the conversion of the binary data into characters implies a certain expansion of these data.

In a second embodiment at least part of the contents of said document corresponds to one or more pointers to said binary data in said binary file.

In this second embodiment the document returns to the binary file to have access to the data. To be of use, the document is thus to be accompanied by the binary file it describes. In this embodiment there is thus no expansion of data.

It is another object of the invention to propose a particular binary file advantageously used for implementing a file transfer method according to the invention.

Such a binary file is formatted into boxes and comprises at least:
 a main box comprising a progressive file,
 and at least an additional box which contains a document written in a markup language describing said progressive file.

The additional box advantageously contains one or more transformations intended to be applied to said document.

Thus all the information relating to an object is regrouped in a single file, which is advantageous from the point of view of file management.

Such a file is, for example, a JPEG 2000 file. In this case the additional box is formed, for example, by the optional "XML" box defined in the JPEG 2000 standard. It may also be constituted by a new dedicated box.

When said source and destination entities are remote from each other, the destination entity is advantageously intended to transmit to the source entity a request relating to an object transfer and said destination entity comprises:
 a server module intended to receive and transmit requests and responses to requests,
 a processing module intended to receive said request relating to an object transfer, to find the basic document corresponding to said request, to transmit to said server module a request relating to said basic document and later to generate a file containing an adapted version of the object to be transferred and to transmit the generated file to the server module in view of it being transmitted to the destination entity,
 a transformation module intended to receive said request coming from said server module, which request relates to said basic document to select a transformation and to transmit a transformed document to said server module in view of transmitting the transformed document to said processing module.

Moreover, the request transmitted by the destination entity permits the source entity to determine a profile of the destination entity, and the transformation applied by said transformation module is a function of said profile. For example, said request comprises a negotiation phase between the source entity and the destination entity to permit the source entity to determine the profile of the destination entity.

The invention notably relates to a method of transferring a file which contains a certain version of an object from a source entity to a destination entity. This transfer method according to the invention comprises a step of generating the version to be used for said transfer. This generation is effected based on a basic document which is written in a markup language and which describes a basic progressive file which contains a basic version of said object. The step permits to generate a transformed document. Finally, this transformed document is used for generating a file which contains another version of the object called adapted version. It is this file that is then transferred to the destination entity.

Figure 1:
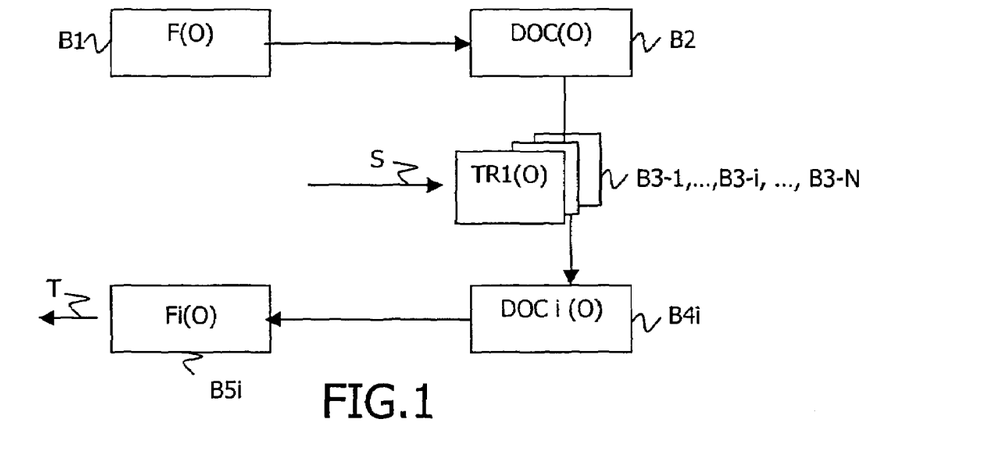
FIG. 1 is a block diagram explaining the various steps of a file transfer method according to the invention.

FIG. 1 shows a block diagram summarizing the steps of a file transfer method according to the invention. Block B1 represents a basic progressive file F(O) corresponding to a certain version of an object O. Block B2 represents a basic document DOC(O) written in a markup language and describing the basic progressive file. Blocks B3-1 to B3-N represent transformations TRi(O) intended to be applied to the basic document DOC(O) to generate a transformed document. A selection step S permits to select a version for the object O and also a transformation to be applied which is a function of the selected version. Block B4-i represents a transformed document DOCi(O) generated by applying the transformation TRi(O) to the basic document DOC(O). Finally, block B5-i represents a file F(i) generated from the transformed document DOCi(O) and which contains another version of the object O. Finally, at step T, the file Fi(O) is transferred to a destination entity.

This file transfer method benefits from the progressive nature of the basic file. It consists of describing the syntax of this progressive basic file in a document so as to be able to manipulate it to generate adapted versions of the object.

Figure 2:
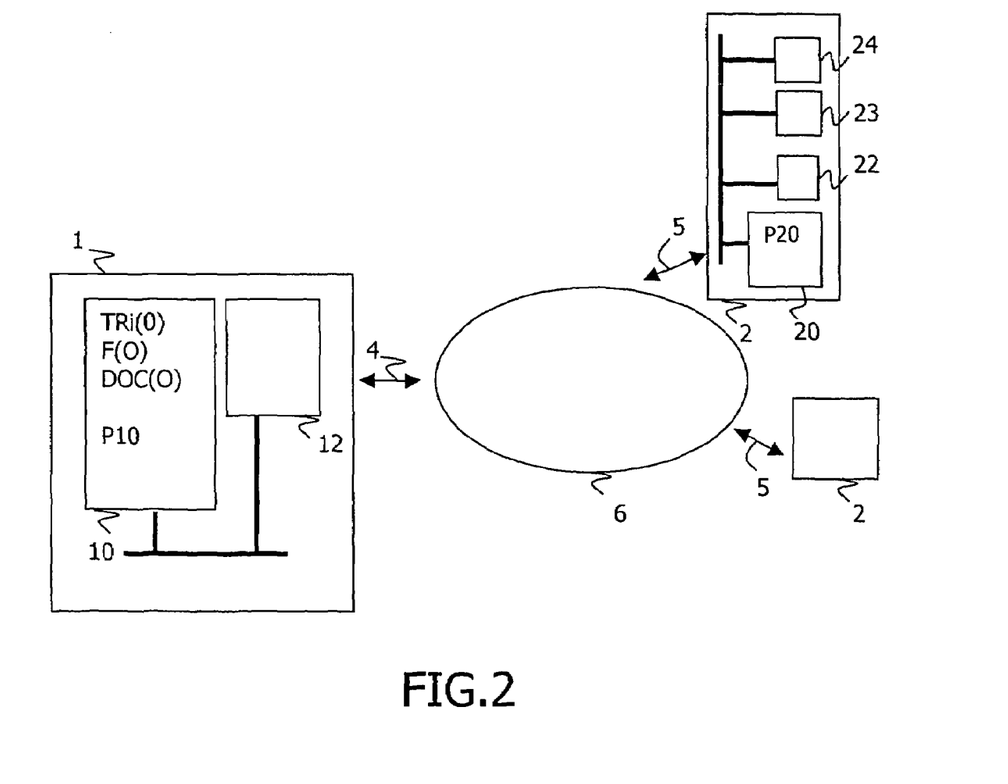
FIG. 2 represents an example of a transmission system according to the invention.

Such a method is advantageously used in a transmission system according to the invention in which the source entity and the destination entity are remote from each other. An example of such a transmission system is represented in FIG. 2. This system comprises a source entity and at least a destination entity each having access to the Internet, which accesses are referred to as 4 and 5, respectively.

In practice, the source entity may be spread over one or various machines. The spreading over various machines permits to distribute the tasks and avoid any overload at the level of the source entity. In the following, to simplify the exposé it is considered that the source entity is accommodated in a single machine called server.

The server 1 has a memory 10 and a processor assembly 12. The memory 10 is, for example, in the form of a read-only memory ROM, a random access memory RAM, a hard disk HD and possibly a removable storage medium FD of the floppy disc type, CD-ROM, DVD . . . inserted into a reader whose function is to read said medium. The memory 10 notably contains:
 a basic progressive file F(O),
 a basic document DOC(O) which describes this basic progressive file,
 at least a transformation TRi(O) intended to be applied to the basic progressive file,
 a set of programs P10 intended to be executed by the processor 12 for the implementation of a file transfer method according to the invention.

The client equipment 2 comprises a memory 20, a processor assembly 22, a screen 23 and a user interface 24 which includes, for example, a keypad, a voice control, a mouse . . . . The memory 22 is formed, for example, by the read-only memory ROM and the random access memory RAM. In certain cases the memory is also in the form of a hard disk HD, and/or disc-type of removable storage medium FD, CD-ROM, DVD . . . inserted into a reader whose function is to read the data stored on said medium. The memory 20 notably contains a known set of programs P20 intended to be executed by the processor 22 for implementing a transfer method according to the invention.

Client equipment 2 is conventionally connected to the Internet and emits a request of the HTTP type containing a resource identifier (HTTP is the network protocol defined in RFC2616 of the IETF; the format of the resource indicators is defined in RFC2396 of the IETF). The equipment which accommodates this resource responds by transferring to said client an HTML document which is then interpreted by the client equipment to display the contents of said document on the screen of the equipment (HTML is a language for describing content said language being currently used on the Internet and defined by the W3C consortium). It is common that an HTML document describes a page intended to be displayed on the screen, and that such a page contains links (for example in the form of buttons or icons) which the user may select to download a file which contains a certain object. When the user selects such a link, the client equipment sends a request of the HTTP type to ask for the transfer of said file.

Figure 3:
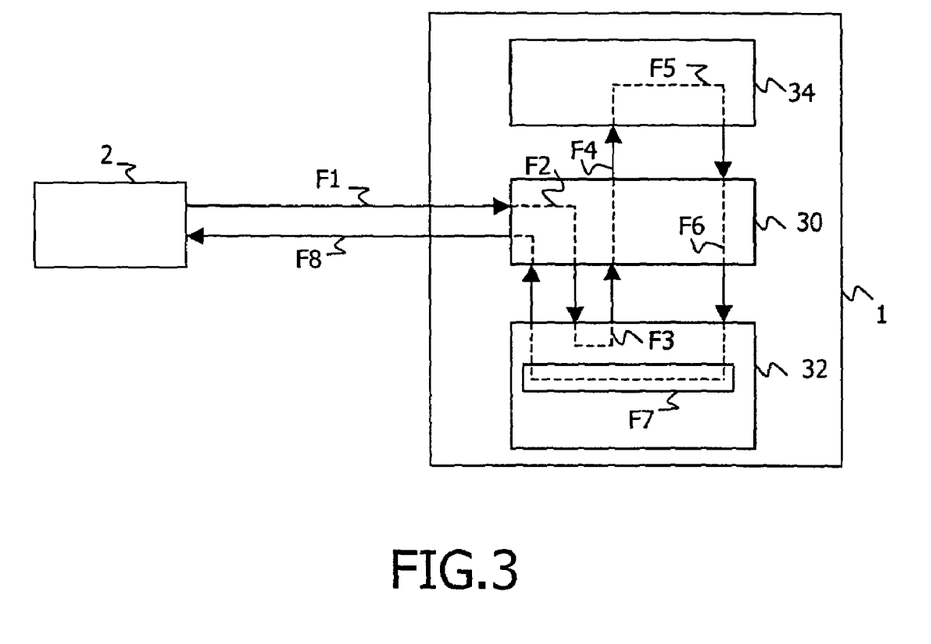
FIG. 3 gives an example of software architecture of a server of a transmission system according to the invention, FIG. 4 describes in a diagram an example of application of a file transfer method according to the invention which utilizes a client-server architecture as given in FIG. 3, FIG. 5 gives a diagrammatic representation of a JPEG 2000 code stream.

In FIG. 3 is shown an example of software architecture for the source entity 1. According to FIG. 3, the source entity 1 comprises three software modules: a server module 30, a processing module 32 and a transformation module 34. The server module 30 is, for example, in the form of a module known by the name of APACHE (APACHE is an http server developed by Apache software foundation). It is configured for transmitting certain requests to other modules. Here the server module 30 transmits the requests relating to files which have a progressive format (for example, the jpeg 2000 files) to the processing module 32, and the requests relating to files written in the mark-up language (for example, the XML files) to the transformation module 34. The transformation module 34 is formed, for example, by a module known by the name of COCOON (COCOON is an application developed in the JAVA language within framework of the APACHE XML project).

The processing module 32 notably has for its function to find the basic document DOC(O) that corresponds to the progressive file format indicated in a request for transmission by the destination entity, and to transmit a request relating to this basic document DOC(O) to the server module 30. When it receives this request, the server module 30 recognizes the mark-up format (for example XML) which is to be processed by the transformation module 34, and it transmits the request to the transformation module 34.

The transformation module 34 has for its function to recover the basic document DOC(O) and select a transformation TRi(O) to be applied to the basic document DOC(O) to produce a transformed document DOCi(O). It returns the transformed document DOCi(O) to the server module 30 which transmits same to the processing module 32.

The processing module 32 then has for its function to generate the binary file Fi(O) which contains an adapted version of the object to be transferred, and to return the object to the server module 30 for it to transmit the object to the destination entity 1.

In FIG. 3 are shown the various steps necessary for the transfer of an adapted version from the source entity 1 to a destination entity 2 in the form of numbered arrows:

The arrow F1 represents the transmission of a request by the destination entity 2 which request relates to the transfer of an object.

At step F2 the server module 30 receives the request transmitted by the destination entity, recognizes the progressive format and transmits the request to the processing module 32, At step F3 the processing module finds the basic document corresponding to the progressive format and launches a request http GET relating to said document. To recover the basic document it applies either an implicit rule (for example, it may be decided that when the file containing the object to be transferred is called image.jp2, the associated XML document is called image.xml), or an explicit rule (for example, a table of correspondence is available which contains the name of the basic document associated to each basic progressive file).

At step F4 the server module 30 transmits the request relating to the basic document to the transformation module 34.

At step F5 the transformation module 34 recovers the basic document, selects a transformation and applies the selected transformation for generating a transformed document which it returns to the server module 30, At step F6 the server module 30 transmits the transformed document returned by the transformation module 34 to the processing module 32, At step F7 the processing module 32 generates a binary file which contains an adapted version of the object to be transferred based on the transformed document, and it returns the generated binary file to the server module 30.

Finally, at step F8, the server module 30 transmits the file containing the adapted version of the object to the destination entity 2.

When the three modules are accommodated in the different machines, they all advantageously reach the same disc on which the data necessary for implementing a transfer method according to the invention are stored, that is to say, more particularly:

the basic progressive files F(0), the basic documents DOC(O) which describe these basic progressive files, the transformations TRi(O) intended to be applied to the basic progressive files.

The processing module 32 and the transformation module 34 are, for example, "servlets", that is to say, applications developed in the JAVA language intended to be executed on a server (for example "cocoon" is a "servlet").

Various applications of a file transfer method according to the invention will now be described in which the client-server architecture described with reference to FIG. 3 is used.

Figure 4:
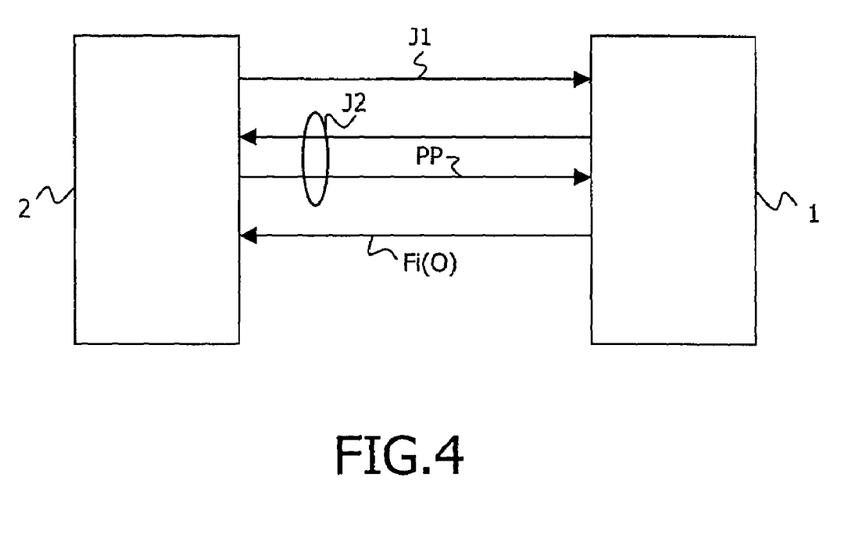

In a first example of application shown in FIG. 4 the request J1 sent by the client 2 permits the server 1 to determine a profile PP of the client 2. In a first embodiment (not shown), the request J1 indicates directly the profile PP of the client 2. In a second embodiment shown in FIG. 4, when the server 1 receives the request J1, it responds by starting a negotiation phase J2. This negotiation phase permits it to know the profile PP of the client 2. The server 1 (and more precisely the transformation module 34 of the server 1) then chooses the transformation to be applied to the basic document DOC(O) to generate an appropriate file as a function of the profile PP of the client. By way of example, such a negotiation phase may be of the type described in RFC2295 published by the IETF in 1998 entitled "Transparent Content Negotiation in HTTP), or in the document "Wireless Application Group, User Agent Profile Specification" published by the "Wireless Application Protocol Forum" on Nov. 10, 1999.

A second example of application relates to the case where the Web pages contain an object of low resolution (often an image) on which the client may click to download a complete resolution of the same object. In that case where the transformation module 34 of the server 1 applies a specific transformation to generate a file that will only contain the data complementary to the data which the client has already used.

A third example of application relates to the case where, on the same Web site, an image is proposed several times (for example, on different pages) in different formats or with different resolutions. When the client navigates among the pages, the server is then caused to transmit various versions of the same image in succession. Each time the transformation module 34 applies the appropriate transformation so as to generate the desired version, so that it is not necessary to store in the server the various image versions which may be transmitted.

The invention is not limited to the use of a client-server architecture of the type described in FIG. 3. The invention also relates to a method of generating a file which contains an adapted version of an object, locally used by a user. For example, such a file generation method is advantageously used by a user who wishes to generate a small image based on a large image.

The invention is applied, for example, to multimedia objects, that is to say, to fixed images audio or video.

The files which contain a version of this type of object are for example, files of the JPEG 2000 format, of the GIF format or of the MPEG4 format. In the following of the description they are qualified as binary files because, physically, they appear as an arbitrary bit sequence.

A progressive file is a file which is organized so that by recovering only part of the file one obtains a degraded version of the object. There are various types of progressiveness: recovering more data may, for example, permit to improve the quality of the signal, to obtain larger sizes of images, to obtain a color image instead of a gray-level image, to increase the frame frequency of a video . . . . For example, the JPEG 2000 files are progressive files.

Certain formats of image files permit to include in an image file a "thumbnail" which is a degraded version (often a smaller version) of the image contained in the image file. This is, for example, the case with Exif 2.1 files ("Digital Still Camera Image File Format Standard; Exchangeable image file format for Digital Still Cameras: Exif, Version 2.1", Jun. 12, 1998, Japan Electronic Industry Development Association (JEIDA)). This type of files also constitute progressive files in the sense of the invention. The basic document associated to this type of file will describe, on the one hand, the thumbnail and on the other hand the image. For example, the transformation will be defined which will permit to extract the part relating to the thumbnail from the basic document, so that a transformed document describing the thumbnail is generated, said transfored document being intended to be used for generating a binary file containing said thumbnail.

In a general manner a markup language is understood to mean a language which utilizes tags and defines rules of use of these tags to describe the syntax of a data set. Such a language thus permits to structure a data set and separate the structure of the data set from its contents.

XML is a typical example of such a markup language. XML offers the advantage of largely being used in the Internet world. Another advantage of XML is that it offers a certain number of tools, notably a tool called XSLT which permits to define transformations which can be applied to XML documents. The definition of a transformation is made via an XSLT style sheet. In an XSLT transformation, an XSLT processor reads an XML document and an XSLT style sheet to generate another document, for example, an XML document. XML and XSLT thus lend themselves particularly well to the implementation of the invention.

In the following of the description and to give concrete examples, the XML language is used for generating documents which describe files of the JPEG 2000 format. This is not restrictive. Another type of markup language and other progressive file formats may be used.

The JPEG 2000 standard is described in the document ISO/IEC FCD15444-1 entitled "JPEG 2000 Final Draft International Standard".

The main JPEG 2000 coding steps are the following:
  a) an optional transformation step of the input image to obtain a representation of the image in the space Y-Cr-Cb, where Y is the luminance component, Cr the chrominance component red and Cb the chrominance component blue;
  b) a wavelet transformation step of the image components;
  c) a quantification step of the obtained coefficients;
  d) a coding step;
  e) a step of inserting data obtained in a bit stream according to a certain progressiveness scheme.

When the image to be coded is very large, a preliminary step permits to divide it into various tiles which are coded independently of each other. In the following of the description, for simplicity of the expose, a limitation will be made to the case where the image comprises a single tile. This is not restrictive.

JPEG 2000 provides the use of four elementary progressiveness schemes: via resolution, quality, spatial location and component. JPEG 2000 also proposes five combinations of these elementary schemes. Each progressiveness scheme corresponds to a specific way of ordering the data in the bit stream.

The bit stream comprises packet headers and packets which contain the useful data resulting from the coding. Each packet of useful data corresponds to a component (i), a layer (j), a level of resolution (k) and a partition location (m). The bit stream is constructed by using four loops. The order of the loops determines the progressiveness scheme used.

For a bit stream having a progressiveness via components, the order of the four loops is, for example, the following: for each component, for each resolution, for each layer, for each partition location=>writing of the packet in the bit stream. For a bit stream having a resolution progressiveness, the order of the four loops is, for example, the following: for each resolution, for each component, for each layer, for each partition location=>writing of the packet in the bit stream. In the following of the description these two examples of progressiveness will be limited to, but the invention is applicable to any type of progressiveness.

In accordance with the JPEG 2000 terminology, all the information relating to an image is combined in a code stream. The code stream comprises a main header, one or more tile part headers each followed by a bit stream and it is ended by an end marker. The main header and the tile part headers are organized in markers and marker segments. Finally, the code stream itself is contained in a binary file.

Figure 5:
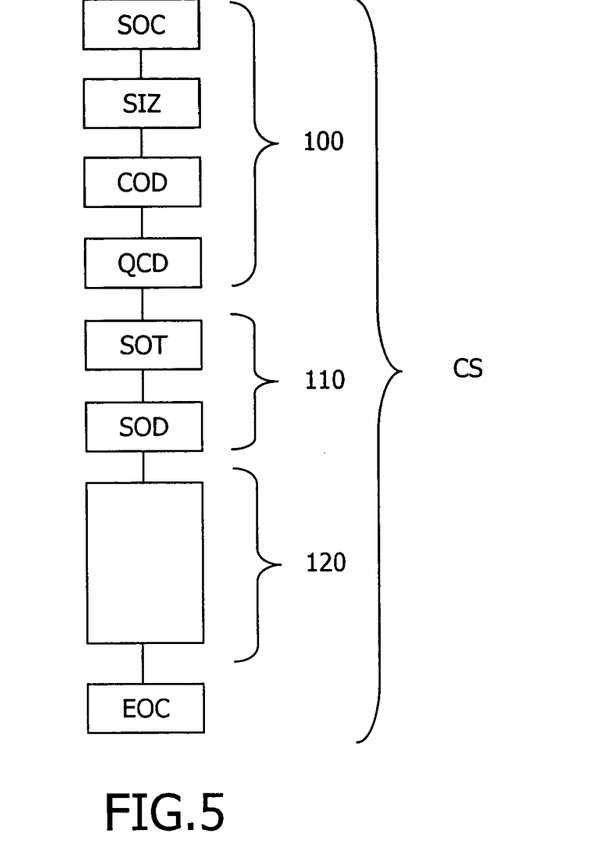

FIG. 5 represents the structure of an example of a JPEG 2000 code stream. This code stream CS starts with a main header 100 which contains a marker SOC (Start Of Code stream) followed by marker segments SIZ (image and tile SIZe), COD (COding style Default) and QCD (Quantization Default). It then comprises a tile part header 110 which contains a marker segment SOT (Start Of Tile part) followed by a marker SOD (Start Of Data). It finally comprises a bit stream 120 in the form of various packets optionally preceded by markers SOP (Start Of Packet) which are used to mark the start of the packets. And it is ended by an end marker EOC (End Of Code stream). The names used here are those of the JPEG 2000 Recommendation. Other optional markers are defined in the JPEG 2000 Recommendation. More particularly, a marker is a two-octet code. And a marker segment comprises a marker and parameters associated to the marker.

The XML language bases will now be explained. This language is described in the Recommendation of the W3C consortium entitled REC-xml-19980210 published on Feb. 10, 1998.

From a physical point of view an XML document may comprise entities that can be analyzed and entities that cannot. An entity that can be analyzed contains text, that is to say, a sequence of characters belonging to a predefined character assembly, which represent tags or textual data. An entity that cannot be analyzed may contain something else than text or a text which is not an XML text.

From a point of view of logics, an XML document contains one or more elements whose limits are marked by an opening tag and a closing tag. Elements may be interleaving with each other. Each element is identified by a name. It may contain contents. It is possible to associate a set of attribute specifications to it. Each attribute specification comprises a name and a value. No attribute name can appear various times in the same start tag.

A method of structuring a JPEG 2000 code stream with the XML language will now be described.

In this example a choice is made to create an XML element for each marker segment of the JPEG 2000 file by applying the following rules:
- the element is named after the three-letter code of the marker,
- the length of the marker, its value and possibly the other parameters associated with the marker are defined as attributes of the element,
- when a parameter or a parameter group is repeated, a sub-element is created instead of an attribute, because the XML language does not permit to have more than one attributes with the same name in a same start tag (this is the case, for example, with the marker segment SIZ which is terminated by a group of three parameters Ssiz, XRsiz and YRsiz repeated for each of the components of the image),
- the packets of the bit stream are included in the document in the form of the contents of an element.

But as the bit stream is composed of purely binary data, it is not possible to directly include it in an XML document (which tolerates only certain well-defined characters).

In a first embodiment, the bit stream is converted into characters. For this purpose, a coding method is advantageously used which is known by the name of "base 64" and described in paragraph 6.8 of the document RFC2045 published by the IETF. This method comprises splitting up the bit stream into groups of 6 bits and associating to each group of 6 bits a character from a character alphabet. This method thus offers the drawback that it brings about an expansion of the data by 33%.

In a second embodiment, in lieu of converting the bit stream into characters to be inserted into the XML document, pointers are introduced in the XML documents, which point at the areas of the basic file which contain the binary data. In this embodiment the XML document becomes dependent on the basic file.

In annex 1 is given by way of non-limiting example, an XML document which describes the JPEG 2000 code stream represented in FIG. 5 for a progression diagram via components. In this example the contents of the packets have been truncated so as to occupy only a single line.

Two examples will now be given of transformations which may be applied to an XML document to generate a transformed XML document which describes an ameliorated version of the image. A transformation generally comprises a suppression of certain of the elements of the basic XML document and a modification of the value of certain attributes and/or of certain elements so as to maintain the coherence of the code stream set.

A first example of transformation is a transformation which can be applied to images coded with a component progressiveness which permits to pass from a color image to a gray-level image. Such a transformation comprises the suppression of the packets of the bit stream that correspond to chrominance components. For this purpose this transformation comprises the following steps:
- suppression of the elements SOP which correspond to the chrominance packets,
- suppression of the elements which contain the attributes Ssiz, XRsiz and YRsiz which relate to the chrominance components,
- modification of the attribute Csiz of the element SIZ which indicates the number of components (old value 3=>new value 1),
- modification of the attribute MarkSegLen of the element SIZ which indicates the size of the marker segment SIZ (old value 38+3.3=47=>new value 38+3.1=41).

Such a transformation is advantageously defined in an XSL-style sheet. In annex 2, by way of non-limiting example, an XSL-style sheet is given intended to be applied to the XML document described in annex 1.

A second example of transformation is a transformation which may be applied to images progressively coded via resolutions, which permits to change from a large size image to a smaller size image. Such a transformation uses an input parameter Nresout which defines the number of resolutions to be obtained. The transformation comprises a suppression of the packets of the bit stream which correspond to resolutions higher than Nresout. For this purpose, the transformation comprises the following steps:
- suppression of the elements SOP corresponding to (Nres-Nresout). Ncomp.Nlayers last packets of the bit stream, where Nres, Ncomp and Nlayers are the numbers of resolutions, components and layers, respectively, used in the progressive basic file, modification of the attributes of the element SIZ which relate to the size of the image: division of the value contained in the attributes Xsiz, XTsiz, Ysiz and YTsiz by $2^{N(res-Nresout)}$, modification of the attribute of the element COD which relates to the number of decomposition levels (nDecompLevel=Nresout), as a function of the quantification style indicated by the attribute Sqcd of the element QCD, suppression of the last elements SPqcd, making the attribute markSegLen to comply with the element QCD.

The two examples of transformation which have just been described are not limitative. The invention may be applied to other types of transformations. For example, transformations may also be defined which may be applied to images progressively coded via layers, which permits to obtain various signal-to-noise ratios.

Figure 6:
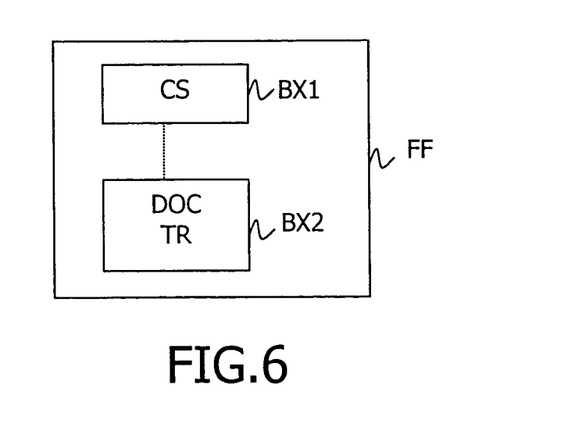
FIG. 6 gives a diagrammatic representation of an example of a binary file according to the invention.

FIG. 6 represents an example of a binary file in the JPEG 2000 format according to the invention. According to FIG. 6 a binary file FF of the JPEG 2000 format comprises a main box BX1 which contains a code stream CS which constitutes a basic progressive file in the sense of the present invention. It also comprises an additional box BX2 which contains an XML document referred to as DOC. The document DOC describes the code stream CS. The additional box B2 can also contain a transformation XSL referred to as TR intended to be applied to the document DOC.

ANNEX 1

```
<?xml version="1.0" ?>
<Codestream>
    <MainHeader>
        <SOC markSegLen="-1" markerCodeStr="ff4f">
        </SOC>
        <SIZ Csiz="3" RsizStr="JPEG 2000 - Part I" XOsiz="0" XTOsiz="0" XTsiz="515"
            Xsiz="515" YOsiz="0" YTOsiz="0" YTsiz="512" Ysiz="512" markSegLen="47"
            markerCodeStr="ff51">
            <Comp_siz Ssiz="7" XRsiz="1" YRsiz="1">
            </Comp_siz>
            <Comp_siz Ssiz="7" XRsiz="1" YRsiz="1">
            </Comp_siz>
            <Comp_siz Ssiz="7" XRsiz="1" YRsiz="1">
            </Comp_siz>
        </SIZ>
        <COD codeBlockHeightExp="4" codeBlockWidthExp="4" ephUsed="false"
            markSegLen="12" markerCodeStr="ff52" mct="1" nDecompLevel="5"
            numLayers="1" optByPass="false" optErTerm="false" optRegTerm="false"
            optResetMQ="false" optSegMarkers="false" optVertStrCausal="false"
            precinctPartitionIsUsed="false" progType="4" progTypeStr="Component"
            sopUsed="true" wavTrans="0" wavTransStr="9-7">
        </COD>
        <QCD Sqcd="2" markSegLen="35" markerCodeStr="ff5c" nGuardBits="2">
            <SPqcd spqcd_val="28440">
            </Spqcd>
            <SPqcd spqcd_val="28394">
            </SPqcd>
            <SPqcd spqcd_val="28394">
            </SPqcd>
            <SPqcd spqcd_val="28348">
            </SPqcd>
            <SPqcd spqcd_val="26368">
            </SPqcd>
            <SPqcd spqcd_val="26368">
            </SPqcd>
            <SPqcd spqcd_val="26338">
            </SPqcd>
            <Spqcd spqcd_val="24396">
            </SPqcd>
            <SPqcd spqcd_val="24396">
            </SPqcd>
            <Spqcd spqcd_val="24420">
            </SPqcd>
            <SPqcd spqcd_val="18435">
            </SPqcd>
            <SPqcd spqcd_val="18435">
            </SPqcd>
            <SPqcd spqcd_val="18501">
            </SPqcd>
            <SPqcd spqcd_val="20434">
            </SPqcd>
            <SPqcd spqcd_val="20434">
            </Spqcd>
            <SPqcd spqcd_val="20321">
            </SPqcd>
        </QCD>
    </MainHeader>
    <TilePartHeader>
        <SOT Isot="0" Psot="32722" TNsot="1" TPsot="0" markSegLen="10"
            markerCodeStr="ff90">
```

ANNEX 1-continued

```
    </SOT>
    <SOD markSegLen="-1" markerCodeStr="ff93">
    </SOD>
    <SOP Lsop="0" Nsop="0" markSegLen="4" markerCodeStr="ff91">
        zokxfjAav/0eNh0KCgQ=
    </SOP>
    <SOP Lsop="0" Nsop="1" markSegLen="4" markerCodeStr="ff91">
        vih3XvSqAxdN7qp7Aubt+hlA5Iai7DNKpOQYs1JGcF+kax9m
    </SOP>
    <SOP Lsop="0" Nsop="2" markSegLen="4" markerCodeStr="ff91">
        ion5YDUL4HqwaIzDAg==
    </SOP>
    <SOP Lsop="0" Nsop="3" markSegLen="4" markerCodeStr="ff91">
        v5HtMkNwzwEIhKL7bEcpU5ZrplIfzrl8kZkNLcm1Cw==
    </SOP>
    <SOP Lsop="0" Nsop="4" markSegLen="4" markerCodeStr="ff91">
        o3a7iCv0m1V/xPkZz6Ks7HXbJYUyLNnyi8JhjOOeYgvi
    </SOP>
    <SOP Lsop="0" Nsop="5" markSegLen="4" markerCodeStr="ff91">
        4opHeHv9L+qiu/Up1NkyVlPIWoc8umfk14Z6eDIzKNGtEvbkCMaknWAcYYxjmf
    </SOP>
    <SOP Lsop="0" Nsop="6" markSegLen="4" markerCodeStr="ff91">
        EnEF62yGwcRtY2ehQYEpuQ==
    </SOP>
    <SOP Lsop="0" Nsop="7" markSegLen="4" markerCodeStr="ff91">
        ldWatY7LLQ==
    </SOP>
    <SOP Lsop="0" Nsop="8" markSegLen="4" markerCodeStr="ff91">
        b3qu8Ev6TqqoK4IItm19Clfij0SVY2qqIMswd7eSOQhyp5bIStP1wM0sB6i2b/jSJMo80vg=
    </SOP>
    <SOP Lsop="0" Nsop="9" markSegLen="4" markerCodeStr="ff91">
        83mg5+Jv95wRIRM61swVVYBHw7eAeb2BNrmBsC1XrTjvzGFL5rYlBCyAn8CS
    </SOP>
    <SOP Lsop="0" Nsop="10" markSegLen="4" markerCodeStr="ff91">
        7psE6fJW2/G3ohpvNaT+ovEFscTFj++9sdVip0XwnPn25oWq2yZYNh+DWr3T7H+V
    </SOP>
    <SOP Lsop="0" Nsop="11" markSegLen="4" markerCodeStr="ff91">
        XaILyXsuXvRI+C4p
    </SOP>
    <SOP Lsop="0" Nsop="12" markSegLen="4" markerCodeStr="ff91">
        W6qLBsuVSFjQRnGVfO27J97dmNDaUYjLttBepCvUXQu71TWIWBzRRROmPgpPBg==
    </SOP>
    <SOP Lsop="0" Nsop="13" markSegLen="4" markerCodeStr="ff91">
        3s+ECWT/ZjkqNaHDcQ==
    </SOP>
    <SOP Lsop="0" Nsop="14" markSegLen="4" markerCodeStr="ff91">
        +eQE2Ek04vydGK+ +tx9kkpjZL6TeiR2nc4crNQ4zHDurQg==
    </SOP>
    <SOP Lsop="0" Nsop="15" markSegLen="4" markerCodeStr="ff91">
        lcQa4O/p/tH7FOjY0fjYefzcUtdrynh7RRVhBftsTu0F6Y5qXhD1D4G2uBd/a7
        uw49QaaPKtfJb8XiaVpXVqBW9LwoqQ==
    </SOP>
    <SOP Lsop="0" Nsop="16" markSegLen="4" markerCodeStr="ff91">
        ZjJalwvkx0SiIQUOsc/RkjO4wqeX6qg3miqkFQ==
    </SOP>
    <SOP Lsop="0" Nsop="17" markSegLen="4" markerCodeStr="ff91">
        gA==
    </SOP>
  </TilePartHeader>
  <EOC markSegLen="~1" markerCodeStr="ffd9">
  </EOC>
</Codestream>
```

ANNEX 2

```
<?xml version="1.0"?>
<!--
    Remove color components :
    For this, this stylesheet performs the following transformation:
    - check that SOP markers are used
    - check progression type
    - check that multiple component transform is used
    - check that nCompOut <= Csiz
    - replace the Csiz attribute value by the wanted value (nCompOut)
    - delete Comp_siz elements accordingly
```

ANNEX 2-continued

```
    - update markSegLen value accordingly
    - delete SOP elements accordingly
    Input parameter : nCompOut, default value = 1
-->
<xsl:stylesheet xmlns:xsl="http://www.w3.org/1999/XSL/Transform"
    version="1.0">
    <xsl:import href="tplCheckSOPUsed.xsl"/>
    <xsl:output method="xml" indent="yes"/>
    <!-- Parameter: number of output components -
    Default value = 1 -->
```

ANNEX 2-continued

```
<xsl:param name="nCompOut">1</xsl:param>
<!-- Match all: default template -->
<xsl:template name="tplAll" match="@*|node( )">
    <xsl:copy>
        <xsl:apply-templates select="@*|node( )"/>
    </xsl:copy>
</xsl:template>
<!-- Match COD/@sopUsed - Overrides tplAll -->
<xsl:template name="tplSopUsed" match="//COD/@sopUsed"
priority="1">
    <!-- Check /COD/sopUsed value -->
    <xsl:call-template name="tplCheckSOPUsed"/>
</xsl:template>
<!-- Match COD - Overrides tplAll -->
<xsl:template name="tplCOD" match="COD" priority="1">
    <!-- Check progType value -->
    <xsl:if test="@progType!=4">
        <xsl:message terminate="yes">
            Error: progression type is <xsl:value-of
            select="@progType"/>
            Should be 4 (progression by color component)
        </xsl:message>
    </xsl:if>
    <!-- Check mct value -->
    <xsl:if test="@mct=0 and //SIZ/@Csiz=3">
        <xsl:message>
            Warning: no multi-component transf. was
            applied to input image.
            If input was RGB, output will be the Red component.
        </xsl:message>
    </xsl:if>
    <!-- Copy COD -->
    <xsl:copy>
        <xsl:apply-templates select="@*"/>
        <!-- Set mct value to 0 -->
        <xsl:attribute name="mct">0</xsl:attribute>
    </xsl:copy>
</xsl:template>
<!-- Match SIZ - Overrides tplAll -->
<xsl:template name="tplSIZ" match="SIZ" priority="1">
    <!-- Check nCompOut value : should be <= Csiz -->
    <xsl:if test="(($nCompOut > @Csiz) or
    ($nCompOut < 1))">
        <xsl:message terminate="yes">
            Error: number of output color components
            should be >= 1
            and < <xsl:value-of select ="@Csiz"/>. Exit . . .
        </xsl:message>
    </xsl:if>
    <xsl:copy>
        <!-- Copy attributes -->
        <xsl:appy-templates select="@*"/>
        <!-- Update Csiz value -->
        <xsl:attribute name="Csiz">
            <xsl:value-of select="$nCompOut"/>
        </xsl:attribute>
        <!-- Update markSegLen value accordingly -->
        <xsl:attribute name="markSegLen">
            <xsl:value-of select="38 + 3 * $nCompOut"/>
        </xsl:attribute>
        <!-- Copy only relevent Comp_siz elements -->
        <xsl:apply-templates select="Comp_siz[position( ) <=
        $nCompOut]"/>
    </xsl:copy>
</xsl:template>
<!-- Match TilePartHeader - Overrides tplAll -->
<xsl:template name="tplTilePartHeader" match="TilePartHeader"
priority="1">
    <!-- Calculate number of output packets -->
    <xsl:variable name="nSOPOut">
        <xsl:value-of select=
        "(//COD/@nDecompLevel + 1) * //COD/@numLayers *
        $nCompOut"/>
    </xsl:variable>
    <xsl:copy>
        <!-- Copy attributes -->
        <xsl:apply-templates select="@*|SOT|SOD"/>
            <!-- Remove SOP packets accordingly -->
            <xsl:apply-templates
```

ANNEX 2-continued

```
        select="SOP[position( ) <=
        $nSOPOut]"/>
        <xsl:message>
            Initial number of SOP : <xsl:value-of
select="count(SOP)"/>
            Output number of SOP : <xsl:value-of
select="$nSOPOut"/>
        </xsl:message>
    </xsl:copy>
</xsl:template>
</xsl:stylesheet>
<?xml version="1.0"?>
<!--
    This stylesheet performs the following transformation:
    - check than "sopUsed" attribute of "COD" element is set to yes,
        otherwise, exit
-->
<xsl:stylesheet xmlns:xsl="http://www.w3.org/1999/XSL/Transform"
version="1.0">
    <!-- Template tplCheckSOPUsed -->
    <xsl:template name="tplCheckSOPUsed">
        <xsl:variable name="sopUsed">
            <xsl:value-of select="//COD/@sopUsed"/>
        </xsl:variable>
        <xsl:if test="$sopUsed!='true'">
            <xsl:message terminate="yes">
                Error: SOP markers are not used in this codesream.
                Cannot process. Exit . . .
            </xsl:message>
        </xsl:if>
        <xsl:copy/>
    </xsl:template>
</xsl:stylesheet>
```

The invention claimed is:

1. A method of transferring a transfer file containing an adapted version of an object from a source entity to a destination entity, wherein said source entity comprises a memory for storing a binary file, the binary file including a basic progressive file, the binary file also including a basic document describing the basic progressive file written a in a markup language and describing the basic progressive file which contains a basic version of said object, said binary file also including one or more transformations, said method comprising the acts of:

selecting a predefined transformation from the one or more transformations included in the binary file, as a function of a profile of said destination entity, transforming said basic document by applying the selected transformation to said basic document, to generate a transformed document, wherein the basic document describes a structure of the basic progressive file so that the structure is visible in the basic document to define the predefined transformation that is applicable to the basic document, and wherein the transforming act avoids having to decode the decoded basic progressive file so as to recode the basic progressive file into another format, generating the transfer file based on said transformed document, and transferring the transfer file to said destination entity.

2. A computer-readable medium having stored thereon a program comprising instructions for the execution of the acts of the method of transferring as claimed in claim 1 when said program is executed by a processor.

3. The method of claim 1, wherein said source entity and said destination entity are remote from each other, and wherein the destination entity is intended to transmit to the source entity a request relating to an object transfer, said destination entity comprising:

a server module intended to receive and transmit requests and responses to the requests, a processing module intended to receive said request relating to an object transfer, to find the basic document corresponding to said request, to transmit to said server module a further request relating to said basic document and later to generate said transfer file containing said adapted version of the object to be transferred and to transmit the transfer file to the server module in view of it being transmitted to the destination entity, and a transformation module intended to receive said further request coming from said server module, wherein the further request relates to said basic document to select said predefined transformation and to transmit said transformed document to said server module in view of transmitting the transformed document to said processing module.

4. The method of claim 3, wherein said request permits the source entity to determine the profile of the destination entity, and the transformation applied by said transformation module is a function of said profile.

5. The method of claim 4, wherein said request comprises a negotiation phase between the source entity and the destination entity to permit the source entity to determine the profile of the destination entity.

6. The method of claim 1 wherein the source entity and the destination entity are not the same entities.

7. The method of claim 1, wherein the transfer file contains reduced content of a complete data requested by the destination entity, said reduced content including complementary data which complement prior data that the destination entity already has, said complementary data and said prior data forming the complete data.

8. The method of claim 1, wherein the transfer file is generated when a need arises from the basic document by applying the transforming act to avoid storage of the transfer file in the memory of the source entity.

9. A method of generating a transfer file which contains an adapted version of an object from a binary file including a basic progressive file, said binary file also including a basic document written in a markup language and describing the basic progressive file which contains a basic version of said object, said binary file also including a predefined transformation, said method comprising the acts of:

generating at a source entity a transformed document by applying to the basic document the predefined transformation which is a function of a profile of a destination entity and previous transmissions to said destination entity from said source entity, wherein the basic document describes a structure of the basic progressive file so that the structure is visible in the basic document to define the predefined transformation that is applicable to the basic document, and wherein the act of generating the transformed document avoids having to decode the basic progressive file so as to recode the decoded basic progressive file into another format; and generating the transfer file from the transformed document.

10. The method of claim 9, wherein said basic document contains elements delimited by tags and which may contain attributes, and wherein said predefined transformation comprises suppressing one or more of the elements and modifying value of one or more of the attributes and/or of one or more the elements.

11. The method of claim 9, wherein the predefined transformation is written in a transformation language which permits to define rules for transforming a document written in said markup language into another document written in said markup language.

12. A computer-readable medium having stored thereon a program comprising instructions for the execution of the acts of the method of generating a file as claimed in claim 9 when said program is executed by a processor.

13. A method comprising the acts of:

providing, in a binary file, a basic document written in a markup language and describing a basic progressive file which contains a basic version of an object, the binary file also including the basic progressive file and one or more predefined transformations, the binary file being stored in a memory, selecting a predefined transformation from the one or more predefined transformations as a function of a profile of a destination entity and previous transmissions to said destination entity from a source entity, wherein the basic document describes a structure of the basic progressive file so that the structure is visible in the basic document to define the predefined transformation that is applicable to the basic document, applying the selected transformation to said basic document, to generate a transformed document, wherein the applying act to generate the transformed document avoids having to decode the basic progressive file so as to recode the decoded basic progressive file into another format, generating a transfer file based on said transformed document, the transfer file containing an adapted version of said object, and transferring the transfer file to said destination entity.

14. Electronic equipment comprising:

a memory which contains a binary file including a basic document written in a markup language and which describes a basic progressive file, the binary file also including the basic progressive file and one or more predefined transformations, and means for:

selecting a predefined transformation from the one or more predefined transformations, as a function of a profile of a destination entity and previous transmissions to said destination entity from a source entity, applying the selected transformation to said basic document, to generate a transformed document, wherein the basic document describes a structure of the basic progressive file so that the structure is visible in the basic document to define the predefined transformation that is applicable to the basic document, wherein the applying act to generate the transformed document avoids having to decode the basic progressive file so as to recode the decoded basic progressive file into another format, generating a transfer file based on said transformed document, the transfer file containing an adapted version of said object, and transferring the transfer file to said destination entity.

* * * * *